H. MUEHLHAUSEN, Jr. & J. THOMSEN.
SHOCK ABSORBER.
APPLICATION FILED AUG. 17, 1908.
924,179.
Patented June 8, 1909
2 SHEETS—SHEET 1.
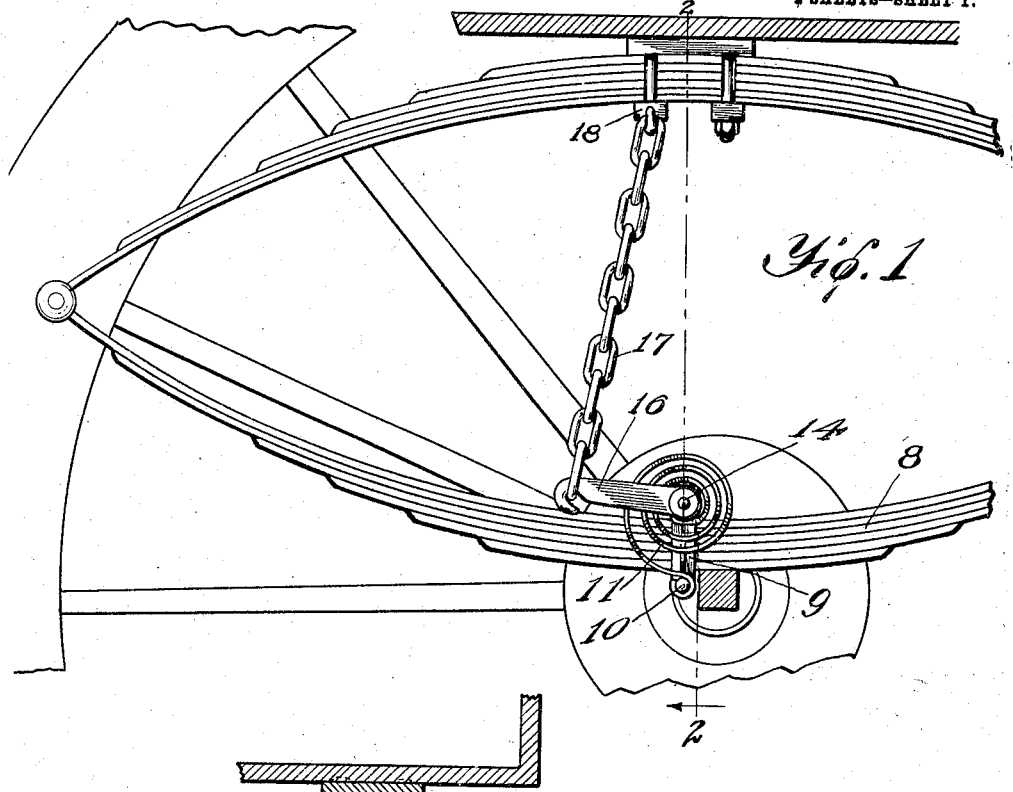
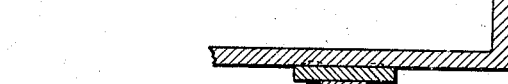
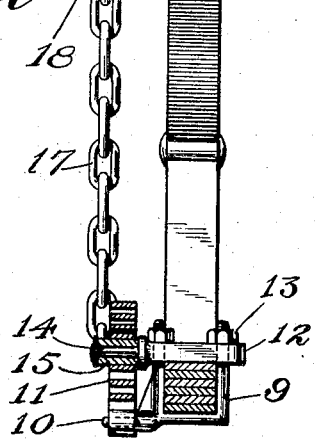
Witnesses
E. H. Lichtenberg
A. W. Fenstermaker
Inventors
Henry Muehlhausen, Jr.
Johannes Thomsen
by Glenn S. Noble Atty.

H. MUEHLHAUSEN, Jr. & J. THOMSEN.
SHOCK ABSORBER.
APPLICATION FILED AUG. 17, 1908.
924,179.
Patented June 8, 1909.
2 SHEETS—SHEET 2.
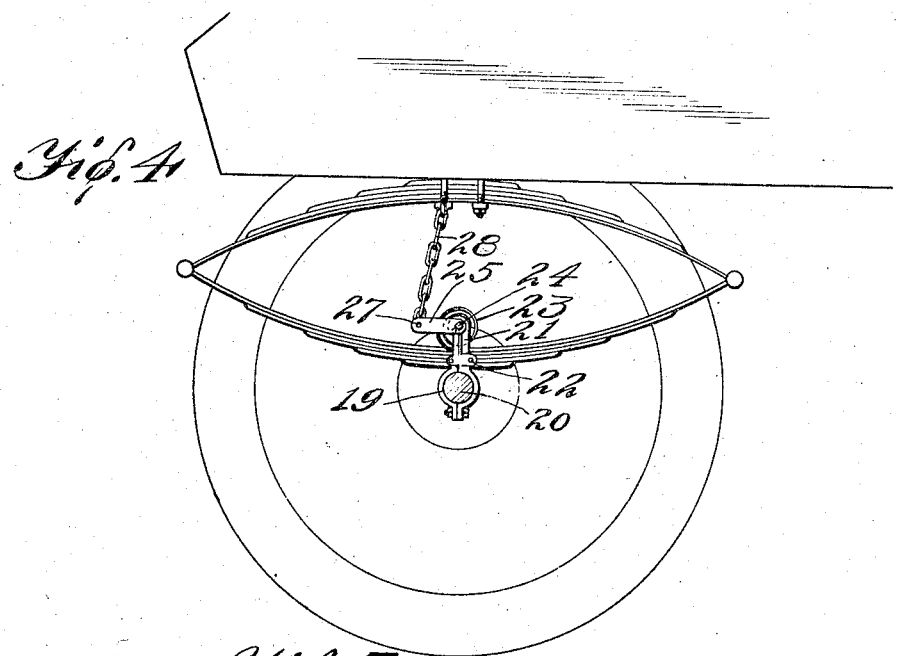
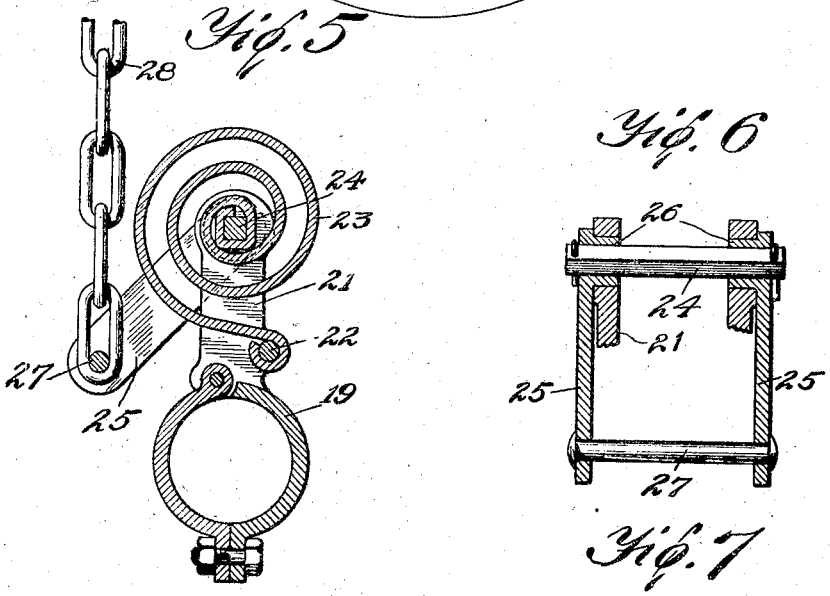
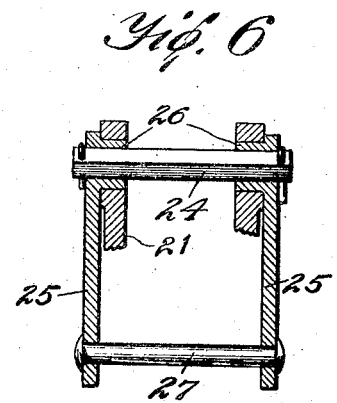
Witnesses
E. H. Lichtenberg
A. W. Kerstemaker
Inventors
Henry Muehlhausen Jr.
Johannes Thomsen
by Glenn S. Noble Atty.

UNITED STATES PATENT OFFICE.

HENRY MUEHLHAUSEN, JR., AND JOHANNES THOMSEN, OF CHICAGO, ILLINOIS.

SHOCK-ABSORBER.

No. 924,179.  Specification of Letters Patent.  Patented June 8, 1909.

Application filed August 17, 1908. Serial No. 448,964.

*To all whom it may concern:*

Be it known that we, HENRY MUEHLHAUSEN, Jr., and JOHANNES THOMSEN, citizens of the United States, residing at Chicago, in the county of Cook and State of Illinois, have invented certain new and useful Improvements in Shock-Absorbers, of which the following is a specification.

This invention relates more particularly to shock absorbers or devices used in connection with vehicles to prevent excessive vibration of the springs, or undue movement of the body of the vehicle in going over rough roads or when the wheels encounter obstructions or pass through ruts.

The objects of this invention are to provide a simple and effective device of this character, which will not be liable to get out of order, and which may readily be adjusted for different sized springs and vehicles.

We have illustrated our invention in the accompanying drawings, in which—

Figure 1 is a side elevation of a vehicle spring with the shock absorber applied thereto; Fig. 2 is a sectional view on the line 2—2 of Fig. 1; Fig. 3 is an enlarged detail showing the arrangement of the spring and lever; Fig. 4 is a side elevation of a portion of a vehicle, shown with a modified form of our device in position; Fig. 5 is a sectional view of the device shown in Fig. 4; Fig. 6 is a detail of the lever arms; and Fig. 7 is a detail of the hook for holding one end of the connecting chain.

As shown in these drawings, 8 indicates a vehicle spring of any ordinary or preferred form of construction to which our device may be applied. A bracket 9 is made to fit over the lower portion of the spring and has a projecting pin 10 adapted to engage with one end of the spring 11. The bracket is completed by, or engages with a clip 12 which is held in position by means of nuts 13. This clip 12 also has a projecting pin or axle 14 on which is mounted a sleeve 15 having a projecting arm 16 provided with means, preferably a hook, at its outer end for engagement with a chain or connecting device 17. The sleeve 15 is secured to the inner end of the spring 11 and for this purpose is preferably made square to engage with a square hole formed at the center of the spring, as shown particularly in Fig. 3. The spring is preferably made in the form of a spiral, making what is commonly known as a clock spring. The opposite end of the chain 17 is connected to the upper side of the spring 8 or to some portion of the body of the vehicle, and for this purpose we provide a hook 18 which is adapted to take the place of one of the clips or cross-pieces ordinarily used for securing the spring 8 to the vehicle body.

When this device is placed in position, the arm 16 is drawn up and the chain 17 adjusted so that there will be a tension placed on the clock spring 11 which may be adjusted in accordance with the nature of the vehicle and the springs used thereon. Of course, these shock absorbers may be applied to all of the springs of a vehicle, or, if desired, to only the rear springs, where the vibration is apt to be greatest. When the wheels of a vehicle enter a depression, or strike an obstruction, so that the body of the vehicle moves relatively toward the axles, the springs of the vehicle will be depressed and the arms 16 will swing downwardly on account of the tension already placed on the springs 11. Then, as the vehicle springs expand and tend to throw the body upwardly, the action will be against the tension of the spring 11, which tension increases as the arm 16 moves up, and thereby prevents the undue upward movement of the vehicle springs and tends to reduce or absorb the shock.

A slightly different arrangement of the device is shown in Figs. 4 to 6, inclusive, in which 19 represents a hinged bracket adapted to be clamped to the axle 20 of the vehicle so that the projecting arms 21 will be held rigidly in any desired position. A pin or rivet 22, extending between the arms 21, adjacent to their inner ends, serves to hold one end of the spring 23 which has its other or inner end secured to a square shaft 24, as indicated in Fig. 5. This shaft engages with square holes in the inner ends of the lever arms 25—25, these arms having rounded projections or bearings 26 which engage with round holes in the ends of the arms 21, as indicated in Fig. 6. A cross-bar or pin 27, at the outer ends of the arms 25, serves as a means of connection for the connecting chain 28 or other equivalent connection which has its opposite end connected at the upper part of the vehicle spring or to the body of the vehicle. The operation of this form of device is substantially the same as that hereinbefore described.

The above description and the accompanying drawings illustrate the essential character of our invention, but we do not wish to be limited to the exact construction or arrangement of parts shown and described.

What we claim and desire to secure by Letters Patent is:

1. The combination with a vehicle spring, of a bracket engaging said spring, a spiral spring having one end secured to said bracket, a bearing on said bracket, a sleeve mounted on said bearing and connected with the opposite end of said spring, an arm projecting from said sleeve, a chain connected to the outer end of said arm, and a hook secured to the top portion of said vehicle spring and connected with the opposite end of said chain.

2. The combination with a vehicle spring, of an auxiliary spiral or clock spring, a support for said auxiliary spring, adjacent to the bottom of said vehicle spring, one end of said auxiliary spring being secured to said support, a sleeve mounted on said support and secured to the opposite end of said auxiliary spring, an arm projecting from said sleeve, and means connecting between said arm and a support adjacent to the opposite side of said vehicle spring.

3. The combination with a vehicle spring, of an auxiliary spiral or clock spring, a support for said auxiliary spring, adjacent to said vehicle spring, one end of said auxiliary spring being secured to said support, a sleeve mounted on said support and secured to the opposite end of said spring, an arm projecting from said sleeve, a chain connected with said arm, and means for connecting said chain with the body of the vehicle.

4. In a shock absorber, the combination of a bracket adapted to be secured to one portion of a vehicle, an axle projecting from said bracket, a sleeve on said axle, a single clock or spiral spring engaging with said sleeve and with a pin on said bracket, an arm projecting from said sleeve, and a flexible connection member having one end secured to said arm and the other end to another portion of said vehicle, whereby the device will act to absorb or reduce the shocks incident to the action of the vehicle springs.

HENRY MUEHLHAUSEN, Jr.
JOHANNES THOMSEN.

Witnesses:
HENRY H. ERLAND,
ALEX. B. PETERSON.